US009817628B2

(12) United States Patent
Sugiyama

(10) Patent No.: US 9,817,628 B2
(45) Date of Patent: Nov. 14, 2017

(54) DISPLAY SYSTEM, DISPLAY TERMINAL, DISPLAY METHOD AND COMPUTER READABLE RECORDING MEDIUM HAVING PROGRAM THEREOF

(71) Applicant: Casio Computer Co., Ltd., Tokyo (JP)

(72) Inventor: Tadahiro Sugiyama, Tokyo (JP)

(73) Assignee: CASIO COMPUTER CO., LTD. (JP)

( * ) Notice: Subject to any disclaimer, the term of this patent is extended or adjusted under 35 U.S.C. 154(b) by 0 days.

(21) Appl. No.: 14/597,943

(22) Filed: Jan. 15, 2015

(65) Prior Publication Data

US 2015/0199167 A1    Jul. 16, 2015

(30) Foreign Application Priority Data

Jan. 16, 2014    (JP) ................................. 2014-006066

(51) Int. Cl.
*G09G 5/00* (2006.01)
*G06F 3/14* (2006.01)
(Continued)

(52) U.S. Cl.
CPC ......... *G06F 3/1454* (2013.01); *G02B 27/017* (2013.01); *G06F 1/163* (2013.01);
(Continued)

(58) Field of Classification Search
None
See application file for complete search history.

(56) References Cited

U.S. PATENT DOCUMENTS 6,304,234 B1 * 10/2001 Horiuchi .............. G02B 27/017
345/1.3
8,866,849 B1 * 10/2014 Cho ................... G02B 27/0172
345/629
(Continued)

FOREIGN PATENT DOCUMENTS

CN         101073050 A      11/2007
CN         101266777 A       9/2008
(Continued)

OTHER PUBLICATIONS

English Translation of Japanese Office Action dated Nov. 4, 2015 for the Japanese Patent Application No. 2014-006066. (3 pages).
(Continued)

*Primary Examiner* — Ifedayo Iluyomade
(74) *Attorney, Agent, or Firm* — Fitch Even Tabin & Flannery LLP

(57) ABSTRACT

The present invention provides a display system including a first display terminal and a second display terminal. The first display terminal includes a first display unit, an acquiring unit configured to acquire information indicating display content which are being displayed by the first display unit, and a sending unit configured to send the information indicating the display content acquired by the acquiring unit to the second display terminal which is communicatably connected to the first display terminal. The second display terminal includes a second display unit, a receiving unit configured to receive the information indicating the display content which is sent from the first display terminal, and a control unit configured to control the second display unit to display relevant information which is related to the display content of the first display unit based on the information indicating the display content received by the receiving unit.

15 Claims, 5 Drawing Sheets

(51) Int. Cl.
*G06F 1/16* (2006.01)
*G02B 27/01* (2006.01)
*G06F 3/147* (2006.01)

(52) U.S. Cl.
CPC ...... *G06F 3/147* (2013.01); *G02B 2027/0178* (2013.01); *G06F 3/1423* (2013.01); *G09G 2356/00* (2013.01)

(56) References Cited

U.S. PATENT DOCUMENTS

| | | | |
|---|---|---|---|
| 2006/0083194 A1 | 4/2006 | Dhrimaj et al. | |
| 2006/0085753 A1 | 4/2006 | Vance et al. | |
| 2008/0225039 A1 | 9/2008 | Oshita et al. | |
| 2011/0213664 A1* | 9/2011 | Osterhout | G02B 27/017 705/14.58 |
| 2013/0002701 A1* | 1/2013 | Ida | H04N 5/64 345/589 |
| 2013/0083009 A1* | 4/2013 | Geisner | G06T 19/006 345/419 |

FOREIGN PATENT DOCUMENTS

| | | |
|---|---|---|
| CN | 103309226 A | 9/2013 |
| JP | H9-244853 A | 9/1997 |
| JP | 2003-223095 A | 8/2003 |
| JP | 2006-292428 A | 10/2006 |
| JP | 2011-186856 A | 9/2011 |
| JP | 2012-43248 A | 3/2012 |
| JP | 2012-128648 A | 7/2012 |

OTHER PUBLICATIONS

Chinese Office Action dated Apr. 28, 2017 issued in corresponding Chinese Patent Application 201510023190.3 and English translation. (18 pages).

* cited by examiner

FIG. 5
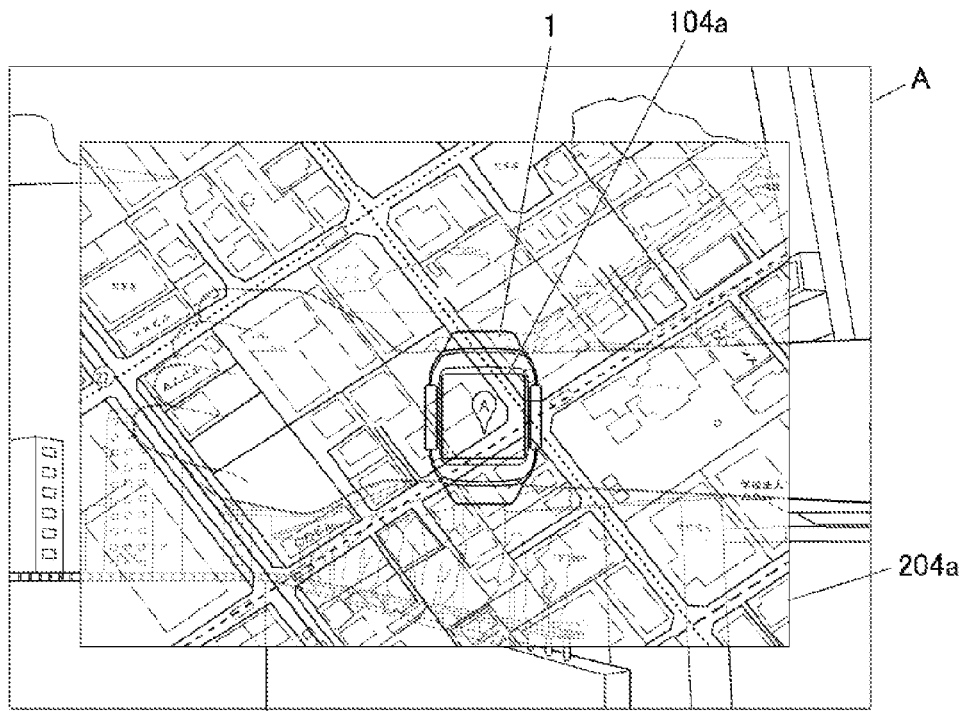
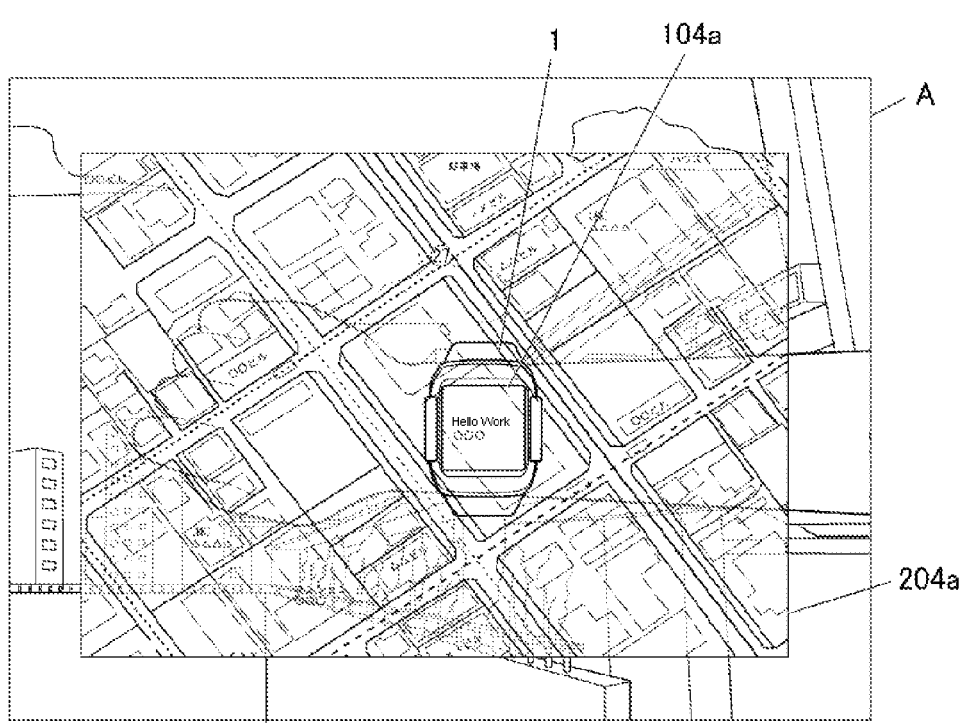

DISPLAY SYSTEM, DISPLAY TERMINAL, DISPLAY METHOD AND COMPUTER READABLE RECORDING MEDIUM HAVING PROGRAM THEREOF

CROSS-REFERENCE TO RELATED APPLICATIONS

This application is based upon and claims the benefit of priority under 35 USC 119 of Japanese Patent Application No. 2014-006066 filed on Jan. 16, 2014, the entire disclosure of which is incorporated herein by reference in its entirety for all purposes.

BACKGROUND OF THE INVENTION

1. Field of the Invention

The present invention relates to a display system, a display terminal, a display method and a computer readable recording medium having a program thereof.

2. Description of the Related Art

Conventionally, there has been known a watch including a display for displaying a variety of information such as a date, a temperature or the like (for example, Japanese Patent Application Laid-Open Publication No. 2006-292428 published on Oct. 26, 2006). Further, recently, a watch-type display terminal capable of displaying information besides a date or a temperature, for example, a map, a website, an image, or the like, on a larger display has been suggested.

However, since such a watch-type display terminal is generally worn on a wrist, its size is limited and a large display area is difficult to be secured. Thus, there is a problem that the watch-type display terminal can display only a part of the map, the website, the image or the like in the case of getting it enlarged and the terminal's usability is poor.

SUMMARY OF THE INVENTION

The present invention was made in light of the problem mentioned above, and an object of the present invention is to provide a display system, a display terminal, a display method and a computer readable recording medium having a program for enabling more information to be displayed efficiently.

According to an embodiment of the present invention, a display system is provided. The display system includes a first display terminal and a second display terminal. The first display terminal includes a first display unit, an acquiring unit configured to acquire information indicating display content which are being displayed by the first display unit, and a sending unit configured to send the information indicating the display content acquired by the acquiring unit to the second display terminal which is communicatably connected to the first display terminal. The second display terminal includes a second display unit, a receiving unit configured to receive the information indicating the display content which is sent from the first display terminal, and a control unit configured to control the second display unit to display relevant information which is related to the display content of the first display unit based on the information indicating the display content received by the receiving unit.

According to an embodiment of the present invention, a display terminal is provided. The display terminal includes a receiving unit configured to receive information indicating display content which are being displayed by a different display terminal communicatably connected to the display terminal and the information is sent from the different display terminal. The display terminal also includes a control unit configured to control a display unit to display relevant information which is related to the display content of the different display terminal based on the information indicating the display content received by the receiving unit.

According to an embodiment of the present invention, a display method is provided. The display method includes acquiring, by a first display terminal of a plurality of display terminals communicatably connected to each other, information indicating display content which are being displayed by a first display unit, sending, by the first display terminal, the acquired information indicating the display content to a second display terminal of the plurality of display terminals, receiving, by the second display terminal, the information indicating the display content sent from the first display terminal, and controlling, by the second display terminal, a second display unit to display relevant information which is related to the display content of the first display unit based on the received information indicating the display content.

According to an embodiment of the present invention, a computer-readable non-transitory recording medium for recording a program readable by a computer of a display terminal communicatably connected to a different display terminal is provided. The program controls the computer to function as a receipt control unit configured to receive information indicating display content which are being displayed by the different display terminal, the information being sent from the different display terminal, and a display control unit configured to control a display unit to display relevant information which is related to the display content of the different display terminal based on the received information indicating the display content.

BRIEF DESCRIPTION OF THE DRAWINGS

The present invention will more sufficiently be understood by the following detailed description and the accompanying drawings, which are, however, exclusively for explanation and do not limit the scope of the present invention.

Here:

FIG. 5 is an illustration for explaining a display process by the display system of FIG. 1.

DETAILED DESCRIPTION OF THE PREFERRED EMBODIMENT

Hereinafter, embodiments of the present invention will be described with reference to the accompanying drawings. The scope of the present invention should not be limited to the embodiments described here.

Figure 1:
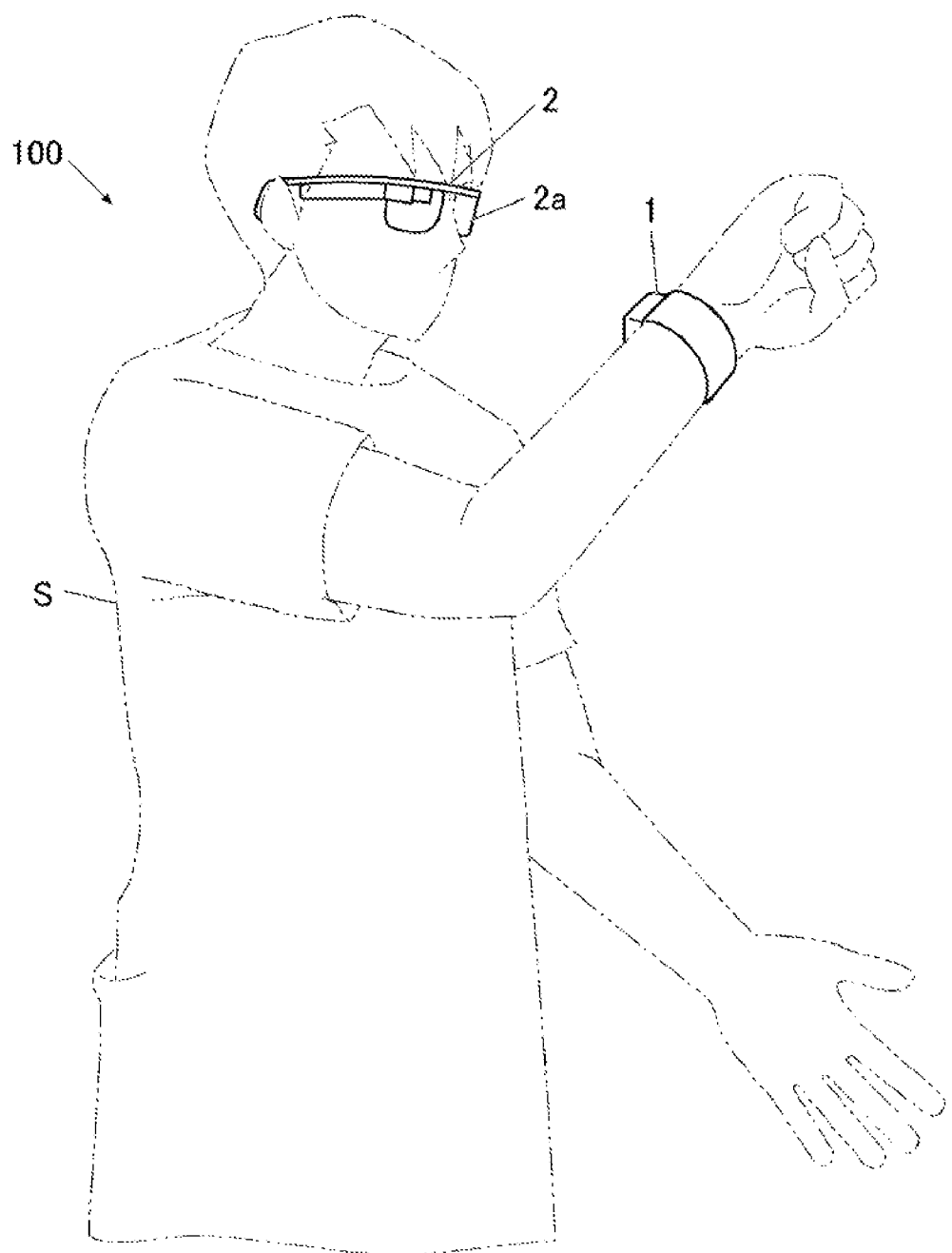
FIG. 1 shows a schematic configuration of a display system according to one embodiment to which the present invention is applied.

FIG. 1 shows a schematic configuration of a display system 100 according to one embodiment to which the present invention is applied.

As shown in FIG. 1, the display system 100 of the present embodiment includes a watch type display terminal 1 (see FIG. 2) and a glasses type display terminal 2 (see FIG. 3) and the watch type display terminal 1 and the glasses type display terminal 2 are connected via a wireless communication line so as to be able to communicate information with each other.

First, the watch type display terminal (a first display terminal) is explained with reference to FIG. 2.

Figure 2:
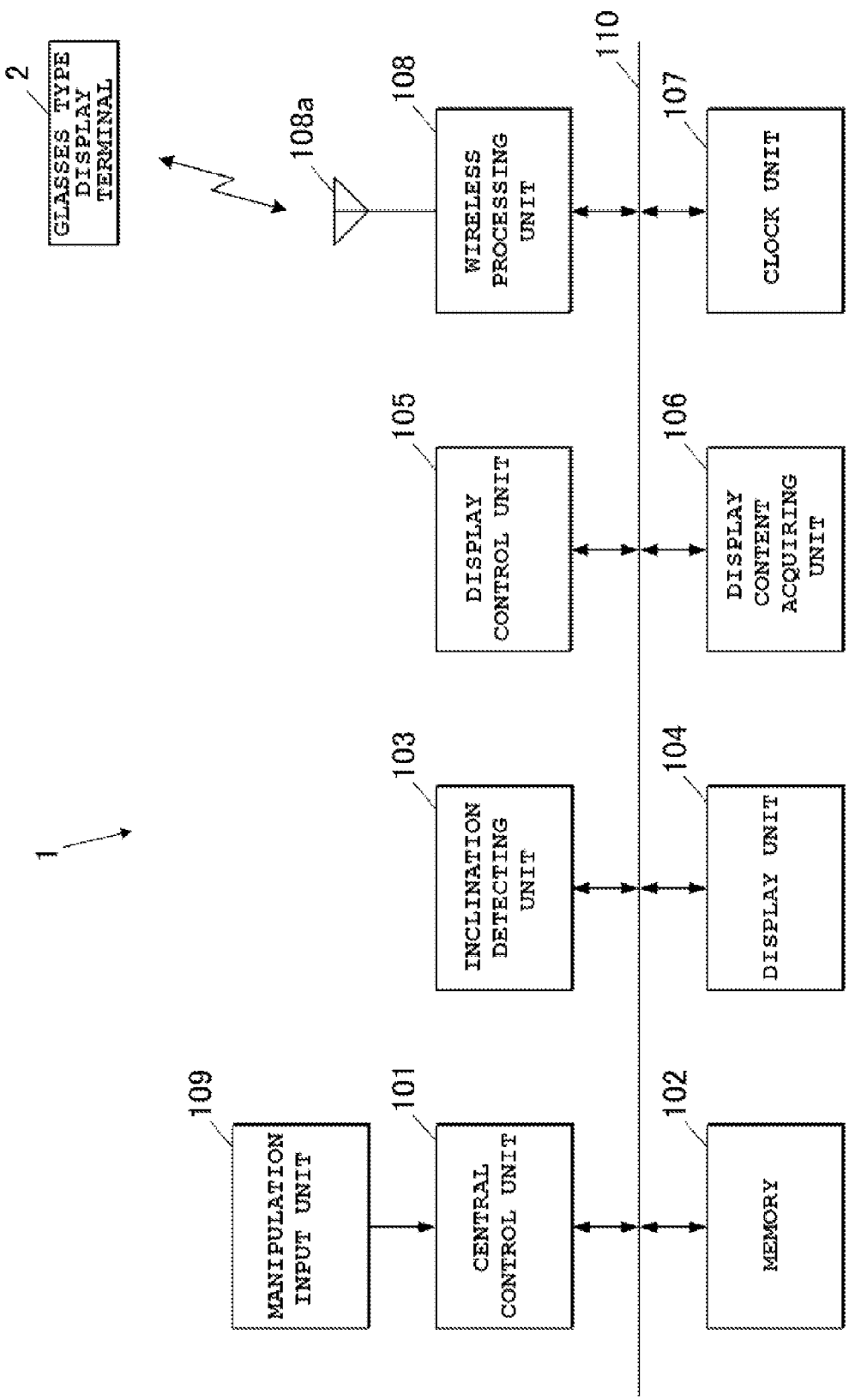
FIG. 2 is a block diagram showing a schematic configuration of a watch type display terminal included in the display system of FIG. 1.

FIG. 2 is a block diagram showing a schematic configuration of the watch type display terminal 1 included in the display system 100.

The watch type display terminal 1 is a so-called wearable computer system worn on a wearer S and, especially, a wrist-mounted computer system (a head mounted display).

As shown in FIG. 2, the watch type display terminal 1 includes a central control unit 101, a memory 102, an inclination detecting unit 103, a display unit 104, a display control unit 105, a display content acquiring unit 106, a clock unit 107, a wireless processing unit 108, and a manipulation input unit 109.

The central control unit 101, the memory 102, the inclination detecting unit 103, the display unit 104, the display control unit 105, the display content acquiring unit 106, the clock unit 107 and the wireless processing unit 108 are connected via a bus line 110 with each other.

The central control unit 101 controls each unit of the watch type display terminal 1. Specifically, the central control unit 101 includes a CPU (Central Processing Unit), a RAM (Random Access Memory) and a ROM (Read Only Memory) which are not shown in the drawing, and performs various control operations according to various process programs for the watch type display terminal 1 (which are not shown in the drawing).

The memory 102 includes, for example, a DRAM (Dynamic Random Access Memory) and temporarily stores data processed by each unit of the watch type display terminal 1 besides the central control unit 101.

The inclination detecting unit 103 detects an inclination of the terminal's main body.

More specifically, the inclination detecting unit 103 detects an inclination of the terminal's main body with respect to a direction of the axis of gravity. For example, the inclination detecting unit 103 includes a three-axis acceleration sensor, determines the direction of the axis of gravity based on a frequency component of 0 Hz of a signal of each axis detected by the three-axis acceleration sensor, and detects an inclination of each axis with respect to the direction of the axis of gravity.

The above described method of detecting the direction of the axis of gravity or the inclination of the terminal's main body with respect to the direction of the axis of gravity by using the three-axis acceleration sensor is merely an example. The detection method of the present invention is not limited to this embodiment and can be changed arbitrarily and properly.

The display unit 104 displays predetermined information.

The display unit 104 includes, for example, an LCD and displays a variety of information in a display area 104a (see FIG. 5(a), etc.) under control of the CPU of the central control unit 101. More specifically, the display unit 104 displays an application screen (for example, a map screen, a webpage screen, or the like) in the display area 104a in accordance with image signals output from the display control unit 105, for example.

The display control unit 105 generates an application screen based on execution of each of various application programs (not shown in the drawing) by the CPU of the central control unit 101 and outputs image signals for the generated application screen to the display unit 104. Further, the display control unit 105 may enlarge or reduce the application screen based on a predetermined manipulation of the manipulation input unit 109 by a user and controls the display unit 104 to display the enlarged or reduced application screen. In this case, sometimes, a part, not the whole, of the application screen is displayed depending on the number of pixels forming the display area 104a.

Further, the application program may be, for example, map display software, electronic mail software, an internet browser, a messenger, game software, electronic dictionary software, a word processor, spreadsheet software, presentation software, image editing software, figure drawing software, a vector graphic editor, a digital camera control program, or the like.

Further, the application program may be stored in the ROM in advance, sent from the glasses type display terminal 2 and received through the wireless processing unit 108, or acquired by a communication processing unit which is not shown in the drawing via a communication network N from an outside server.

The display control unit 105 may further tilt the display content which are being displayed in the display area 104a based on information indicating the inclination of the terminal's main body detected by the inclination detecting unit 103 and control the display unit 104 to display the content. In other words, the display control unit 105 transforms the display content so as to have depth according to an inclination of the terminal's main body with respect to the direction of the axis of gravity.

For example, in the case of displaying a map screen as the application screen, it is determined whether or not the terminal's main body faces the direction of the eyes of the wearer S according to the inclination with respect to the direction of the axis of gravity. Then, in the case that the terminal's main body faces the direction of the eyes of the wearer S, the display control unit 105 acquires two-dimensional map information and controls the display unit 104 to display a two-dimensional map screen. In the case that the terminal's main body does not face the direction of the eyes of the wearer S, the display control unit 105 acquires three-dimensional map information and controls the display unit 104 to display a three-dimensional map screen.

The technology for transforming the display content is a conventional technology and detailed explanation on this is omitted here.

The display content acquiring unit 106 acquires information indicating the display content which are being displayed by the display unit 104.

Specifically, the display content acquiring unit 106 acquires, for example, identification information for identifying predetermined information which is being displayed by the display unit 104 (for example, a map application), range information for indicating a display range in the case that an application screen is being displayed by the display unit 104, or the like.

Here, the range information means information indicating a range which is being displayed in the display area 104a of the display unit 104 among all pixel information forming the application screen. For example, the range information includes information indicating a pixel position corresponding to a pixel of each corner of the display area 104a among all the pixel information forming the application screen.

The clock unit 107 includes, for example, a timer, a clock circuit (not shown in drawing), or the like, and acquires time information by clocking the present time. Then, the clock unit 107 outputs the acquired time information to the memory 102.

Further, the clock unit 107 may specify a date, a day of the week, etc. based on the acquired time information.

The wireless processing unit 108 performs control of information communication with an external device such as the glasses type display terminal 2 connected via a predetermined wireless communication line.

The wireless processing unit 108 connects with the glasses type display terminal 2 via a wireless PAN realized by a local wireless communication standard by which a wirelessly communicatable distance is limited to a predetermined distance such as Bluetooth (registered trademark), for example.

More specifically, the wireless processing unit 108 includes, for example, a control module for performing Bluetooth communication with the glasses type display terminal 2 via a communication antenna 108a. Further, the wireless processing unit 108 communicates device information and data of an authentication key with a communication counterpart by using a wireless signal, for example, by executing communication setting processing referred to as a pairing in advance. After that, connection with the communication counterpart is automatically or semi-automatically made and broken without executing the communication setting processing every time. For example, in the case that the watch type display terminal 1 is separated from the glasses type display terminal 2 by a distance to which radio waves cannot reach, the communication connection is broken. On the other hand, in the case that they are close to each other so as to be in a range where radio waves can reach, the communication connection is automatically made. Alternately or additionally, the connection is semi-automatically made or broken by a manipulation of connection or disconnection.

Further, the wireless processing unit 108 sends the information indicating display content acquired by the display content acquiring unit 106 to the glasses type display terminal 2.

More specifically, the wireless processing unit 108 sends the identification information and/or the range information as the information indicating display content acquired by the display content acquiring unit 106 to the glasses type display terminal 2. The wireless processing unit 108 may send the information showing the inclination of the terminal's main body detected by the inclination detecting unit 103 to the glasses type display terminal 2.

The wireless processing unit 108 may include, for example, a wireless LAN module, and use the peer to peer technology (ad-hoc mode) for directly establishing a wireless communication line with a wireless processing unit 207 of the glasses type display terminal 2 without using an external access point.

The manipulation input unit 109 inputs various instructions to the terminal's main body.

More specifically, the manipulation input unit 109 includes various buttons (not shown in the drawing) such as a power button relating to power on/off of the terminal's main body, right or left and top and bottom cursor buttons or decision buttons relating to instructions of selection of modes, functions, or the like.

If any of the buttons is manipulated by the user, the manipulation input unit 109 outputs an operation instruction in accordance with the manipulated button to the central control unit 101. The central control unit 101 controls each unit to execute a predetermined operation (for example, display of a map screen) according to the operation instruction output from the manipulation input unit 109.

Further, the manipulation input unit 109 may a touch panel incorporated with the display unit 104 and, based on a predetermined manipulation of the touch panel by the user, output an operation instruction in accordance with the predetermined manipulation to the central control unit 101.

Next, the glasses type display terminal 2 is explained with reference to FIG. 3.

Figure 3:
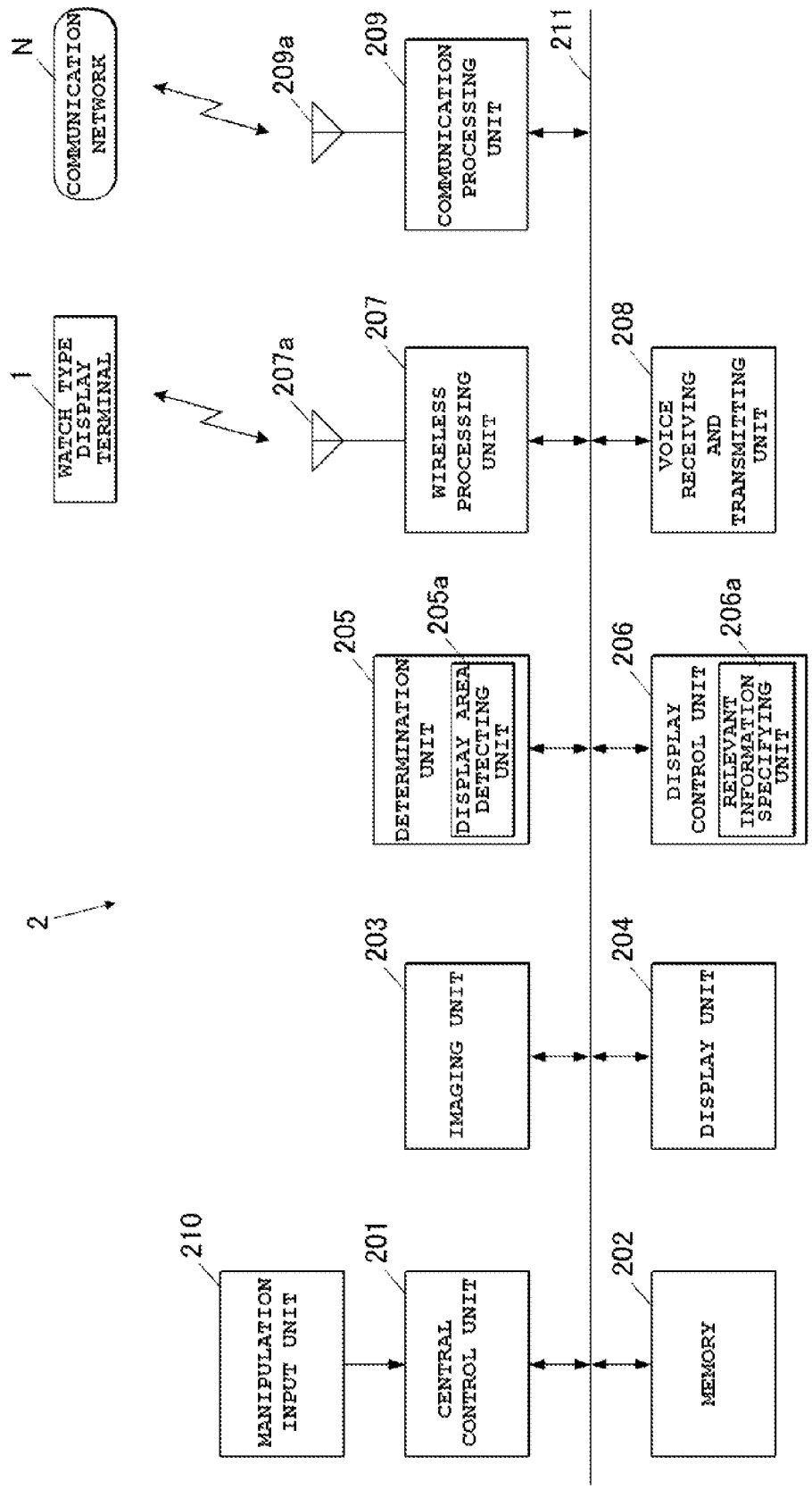
FIG. 3 is a block diagram showing a schematic configuration of a glasses type display terminal included in the display system of FIG. 1.

FIG. 3 is a block diagram showing a schematic configuration of the glasses type display terminal 2 included in the display system 100.

The glasses type display terminal 2 is a so-called wearable computer system worn on the wearer S and, especially, a computer system worn on the head (a head mounted display). More specifically, the glasses type display terminal 2 can be worn on the head like glasses.

As shown in FIG. 3, the glasses type display terminal 2 includes a central control unit 201, a memory 202, an imaging unit 203, a display unit 204, a determination unit 205, a display control unit 206, a wireless processing unit 207, a voice receiving and transmitting unit 208, a communication processing unit 209 and a manipulation input unit 210.

The central control unit 201, the memory 202, the imaging unit 203, the display unit 204, the determination unit 205, the display control unit 206, the wireless processing unit 207, the voice receiving and transmitting unit 208 and the communication processing unit 209 are connected via a bus line 211 with each other.

The central control unit 201 controls each unit of the glasses type display terminal 2. Specifically, the central control unit 201 includes a CPU (Central Processing Unit), a RAM (Random Access Memory) and a ROM (Read Only Memory) which are not shown in the drawing, and performs various control operations according to various process programs for the glasses type display terminal 2 (which are not shown in the drawing).

The memory 202 includes, for example, a DRAM (Dynamic Random Access Memory) and temporarily stores data processed by each unit of the glasses type display terminal 2 besides the central control unit 101.

The imaging unit 203 captures an image of a range almost the same as the direction of the eyes of the wearer S, i.e. a field of vision A (see FIG. 5(*a*)). Specifically, the imaging unit 203 includes, for example, a lens unit, an electronic imaging unit, and an imaging control unit which are not shown in the drawing.

The lens unit includes a plurality of lenses such as a zoom lens, a focus lens, or the like (not shown in the drawing).

The electronic imaging unit includes an image sensor such as a CCD (Charge Coupled Device), a CMOS (Complementary Metal-oxide Semiconductor), or the like, and converts an optical image which has passed various lenses of the lens unit into a two-dimensional image signal.

The imaging control unit includes, for example, a timing generator, a driver, and the like (not shown in the drawing). Further, the imaging control unit drives scanning of the electronic imaging unit by the timing generator and the driver to convert an optical image formed by the lens unit into a two-dimensional image signal every predetermined period by the electronic imaging unit, reads out a frame image for each screen from an imaging region of the electronic imaging unit and outputs the frame image to the memory 202. Each frame image is sequentially processes by an image processing unit which is not shown in the drawing and converted into a brightness signal Y and color difference signals Cb, Cr (YUV data) having digital values.

The display unit 204 displays light of a picture image and light of an outside image corresponding to the field of vision A in a display area 204*a* such that they are superimposed and transmitted by the display area 204*a*.

More specifically, the display unit 204 includes an optical element disposed in front of a lens of a glasses main body 2*a*. The optical element is a holography optical element, and light of an outside image in front of the wearer S passes through the optical element and reaches the eyes of the wearer S while light of a picture image generated by the display control unit 206 (for example, relevant information) is guided (i.e. diffracted and reflected) to the eyes of the wearer S by the optical element. Thus, the light of the outside image and the light of the picture image are superimposed, and the outside image and the picture image are synthesized and reflected in the eyes of the wearer S.

Further, picture image signals generated by the display control unit 206 are input to the display unit 204 and the display unit 204 produces (or displays) a picture image based on the signals. For example, the display unit 204 includes a display controller, a display element (for example, a liquid crystal display element, a spatial light modulation element such as a digital micromirror device, or the like), a light source device, and the like (not shown in the drawing). The display controller controls the light source device and the display element based on picture image signals. By irradiating the display element with light of primary colors (for example, red light, blue light and green light) by the light source device and driving the display element by the display controller, the light with which the display element is irradiated is modulated and controlled for each pixel. Thus, a picture image is produced by the display element. In the case that the display element of the display unit 204 is a light emitting display element, the display unit 204 is provided with no light source device.

The picture image produced by the display unit (especially, the display element) 204 is projected onto the eyes of the wearer S by the optical element and a projection lens.

The determination unit 205 determines whether or not the display area 104*a* of the display unit 104 of the watch type display terminal 1 exists within the display area 204*a* of the display unit 204. In other words, the determination unit 205 determines whether or not the display area 104*a* of the display unit 104 of the watch type display terminal 1 is in a location where it can be seen by the user over the display area 204*a* of the glasses type display terminal 2.

More specifically, the determination unit 205 includes a display area detecting unit 205*a* for detecting the display area 104*a* of the display unit 104 of the watch type display terminal 1.

The display area detecting unit 205*a* detects coordinates of a plurality of points (for example, points of four corners) of the display area 104*a* of the display unit 104 of the watch type display terminal 1 included within a frame image corresponding to a range almost the same as the field of vision A imaged by the imaging unit 203. For example, the display area detecting unit 205*a* performs predetermined feature extraction processing for image data of a binary image which is obtained by executing predetermined binary processing for the frame image and extracts the display area 104*a* approximately having the shape of a frame.

Since the display area 204*a* of the display unit 204 displays the light of the outside image corresponding to the imaging range of the imaging unit 203 in the state where the light of the outside image is superimposed onto the light of the picture image and transmitted by the display area 204*a*. The display area 204*a* of the display unit 204, the determination unit 205 determines whether or not the display area 104*a* of the display unit 104 of the watch type display terminal 1 exists within the display area 204*a* of the display unit 204.

Here, in the case that markers are attached to the four corners of the display area 104*a* of the watch type display terminal 1, the display area detecting unit 205*a* may detect the display area 104*a* by detecting the markers. The feature extraction processing is a conventional technology and detailed explanation on this is omitted here.

The display control unit 206 produces a display application screen based on execution of various application programs (not shown in the drawing) by the CPU of the central control unit 201 and outputs image signals according to the produced display application screen to the display unit 204.

Further, similarly to the watch type display terminal 1, the application program may be, for example, map display software, electronic mail software, an internet browser, a messenger, game software, electronic dictionary software, a word processor, spreadsheet software, presentation software, image editing software, figure drawing software, a vector graphic editor, a digital camera control program, or the like.

Further, the application program may be stored in the ROM in advance, or acquired by a communication processing unit 209 via the communication network N from an outside server.

The display control unit 206 controls the display unit 204 to display relevant information which is related to the display content of the display unit 104 of the watch type display terminal 1 based on information indicating the display content which is received by the wireless processing unit 207.

More specifically, based on the identification information for identifying predetermined information (for example, a map application) displayed by the display unit 104 of the watch type display terminal 1, which is the information indicating the display content received by the wireless processing unit 207, a relevant information specifying unit 206*a* of the display control unit 206 specifies the predetermined information as information to be displayed by the display unit 204. Then, the display control unit 206 produces a display application screen corresponding to the specified information and outputs image signals according to the produced application screen to the display unit 204.

As described above, the relevant information includes information corresponding to the display content which are being displayed by the display unit 104 of the watch type display terminal 1 as its part. But, this is merely an example, and the relevant information is not limited to this embodiment and can be changed arbitrarily and properly. For example, the relevant information may be information explaining in detail the display content which are being displayed by the display unit 104 of the watch type display terminal 1 (for example, in the case of a map, explanation of a business operated in a building at a spot in the map, or in the case of an image, imaging conditions such as an exposure, a focal length, or the like).

Further, based on the range information indicating a display range of the application screen displayed by the display unit 104 of the watch type display terminal 1 which is information indicating the display content received by the wireless processing unit 207, the display control unit 206 specifies a display range of a display application screen to be displayed by the display unit 204. In the case that the determination unit 205 determines that the display area 104a of the display unit 104 of the watch type display terminal 1 exists within the display area 204a of the display unit 204 of the glasses type display terminal 2, the display control unit 206 controls the display unit 204 to display a display application screen corresponding to the application screen which is being displayed by the display unit 104 of the watch type display terminal 1 in the display area 204a. More specifically, the display control unit 206 controls the display unit 204 to display the display application screen in the display area 204a such that a part of the display application screen to be displayed by the display unit 204 corresponding to the display content of the application screen displayed by the display unit 104 of the watch type display terminal 1 matches the display content of the application screen displayed by the display unit 104 in their positions.

In other words, in the case that the display area 104a of the display unit 104 of the watch type display terminal 1 exists within the display area 204a of the display unit 204, light of outside image of the application screen displayed in the display unit 104 of the watch type display terminal 1 is transmitted by the display area 204a of the display unit 204 (see FIG. 5(a)). Based on the range information indicating a display range of the application screen displayed by the display unit 104 of the watch type display terminal 1, the display control unit 206 specifies a range in the display application screen to be displayed by the display unit 204 which corresponds to the display content of the watch type display terminal 1. The display control unit 206 places the specified range such that it matches the application screen which is being displayed by the display unit 104 of the watch type display terminal 1 transmitted by the display area 204a and controls the display unit 204 to display a part of the display application screen other than the specified range in the display area 204a such that the part of the display application screen is transmitted by the display area 204a. Content transmitted and displayed by the display area 204a of the display unit 204 may include the specified range displayed by the display unit 104 of the watch type display terminal 1 or may be content other than the specified range.

Further, the range in the display application screen which corresponds to the display content of the watch type display terminal 1 may be transmitted and displayed by the display unit 204 (such that it is superimposed onto the display area 104a of the display unit 104 of the watch type display terminal 1) or a part of the display application screen other than the range may be transmitted and displayed by the display unit 204.

In addition, based on information indicating the inclination of the terminal's main body detected by the inclination detecting unit 103 of the watch type display terminal 1, the display control unit 206 may control the display unit 204 to tilt the application screen displayed in the display area 204a of the display unit 204.

The method of tilting the application screen and displaying it in the display area 204a of the display unit 204 is similar to that for the watch type display terminal 1 and detailed explanation on this is omitted.

The wireless processing unit 207 performs control of information communication with an external device such as the watch type display terminal 1 connected via a predetermined wireless communication line.

Similarly to the wireless processing unit 108 of the watch type display terminal 1, the wireless processing unit 207 connects with the watch type display terminal 1, for example, via a wireless PAN realized by a local wireless communication standard by which a wirelessly communicatable distance is limited to a predetermined distance such as Bluetooth (registered trademark) through a communication antenna 207a.

Further, the wireless processing unit 207 receives information indicating display content sent from the watch type display terminal 1.

More specifically, the wireless processing unit 207 receives the identification information and/or the range information for indicating the display content acquired by the display content acquiring unit 106 of the watch type display terminal 1 and sent via the wireless PAN. Further, in the case that the information indicating inclination of the terminal's main body is sent from the watch type display terminal 1, the wireless processing unit 207 receives the information indicating the inclination of the terminal's main body.

Similarly to the wireless processing unit 108 of the watch type display terminal 1, the wireless processing unit 207 may include, for example, a wireless LAN module, and use the peer to peer technology (ad-hoc mode) for directly establishing a wireless communication line with the wireless processing unit 108 of the watch type display terminal 1 without using an external access point.

The communication processing unit 209 sends and receives data via the communication network N and a communication antenna 209a.

The communication antenna 209a can send and receive data according to a predetermined communication method (for example, W-CDMA (Wideband Code Division Multiple Access), GSM (Global System for Mobile Communications; Registered Trademark), or the like) adopted in communication between the glasses type display terminal 2 and a wireless base station (not shown in the drawing). Further, according to a communication protocol corresponding to the predetermined communication method, the communication processing unit 209 sends/receives data via the communication antenna 209a to/from the wireless base station by a communication channel established by the communication method.

The configuration of the communication processing unit 209 is merely an example and can be changed arbitrarily and properly. For example, the communication processing unit 209 may be configured to have a wireless LAN module and access to the communication network N via an access point but this configuration is not shown in the drawing.

The communication network N connects the glasses type display terminal 2 to an external device via a wireless based station, a gateway server, or the like (not shown in the drawing).

Further, the communication network N is established by using a dedicated line or an existing general public line, for example, and any of various types of lines such as LAN (Local Area Network) or WAN (Wide Area Network) can be adopted. In additions, the communication network N includes, for example, any of various communication networks such as a telephone line network, am ISDN line network, a dedicated line, a vehicle network, a communication satellite line, a CATV line network, or the like, an IP network, a VoIP (Voice over Internet Protocol) gateway, an internet service provider, and the like.

The manipulation input unit 210 inputs various instructions to the main body of the glasses type display terminal 2.

More specifically, the manipulation input unit 210 includes various buttons (not shown in the drawing) such as a power button relating to power on/off of the terminal's main body, right or left and top and bottom cursor buttons or decision buttons relating to instructions of selection of modes, functions, or the like.

If any of the buttons is manipulated by the user, the manipulation input unit 210 outputs an operation instruction in accordance with the manipulated button to the central control unit 201. The central control unit 201 controls each unit to execute a predetermined operation according to the operation instruction output from the manipulation input unit 109.

<Display Process>

Next, a display process of the display system 100 is explained with reference to FIG. 4.

Figure 4:
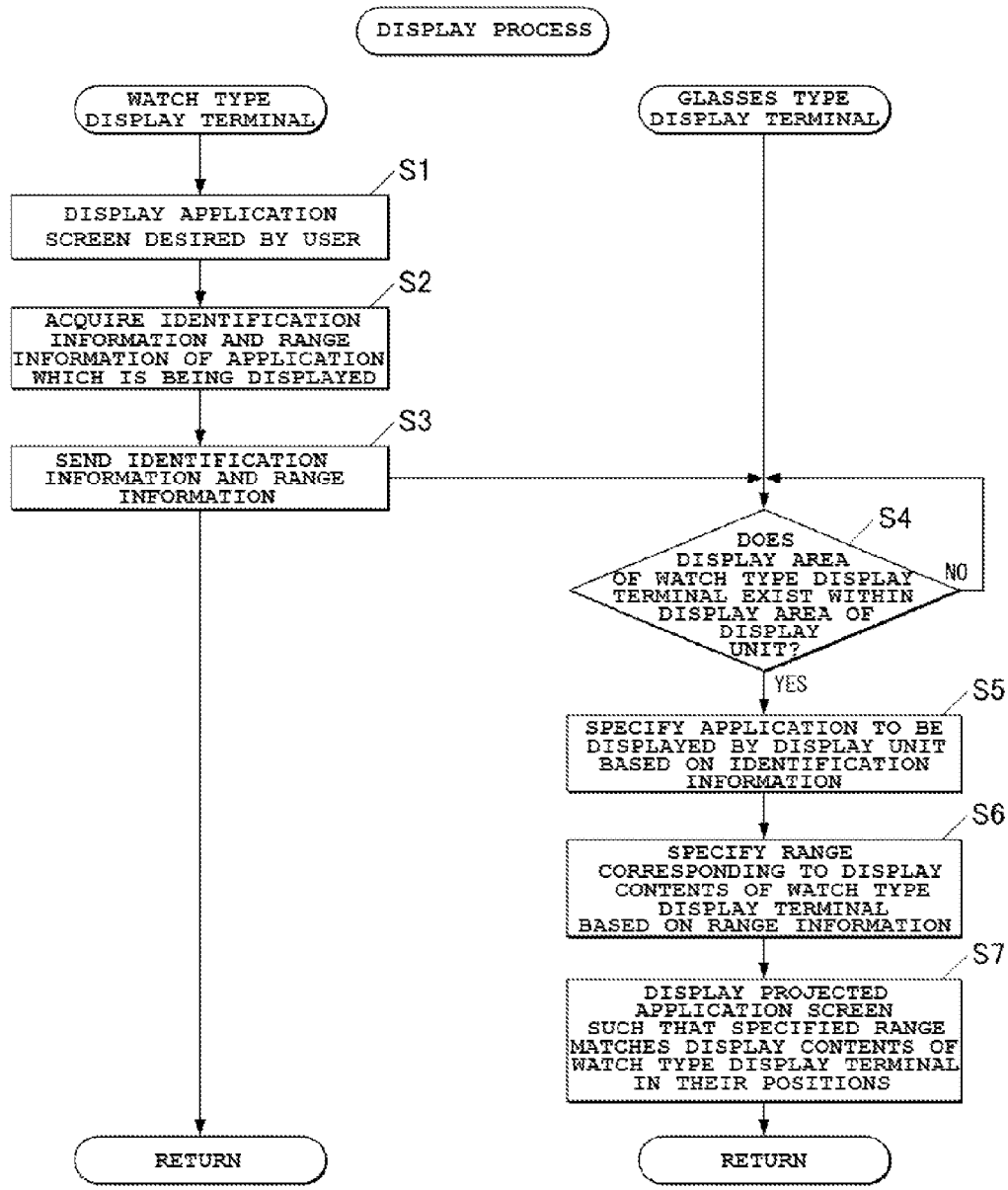
FIG. 4 is a flow chart showing an example of operations relating to a display process by the display system of FIG. 1.

FIG. 4 is a flow chart showing an example of operations relating to the display process.

Hereinafter, it is supposed that the watch type display terminal 1 and the glasses type display terminal 2 are connected to communicate information via a wireless PAN.

As shown in FIG. 4, if a desired application is designated in the watch type display terminal 1 based on a predetermined manipulation of the manipulation input unit 109 by the user, the CPU of the central control unit 101 executes an application program corresponding to the application and the display control unit 105 controls the display unit 104 to display an application screen (Step S1).

Next, the display content acquiring unit 106 acquires identification information for identifying the application corresponding to the application screen which is being displayed and/or range information for indicating a display range of the application screen which is being displayed by the display unit 104 as information indicating display content which are being displayed by the display unit 104 (Step S2).

Then, the wireless processing unit 108 sends the identification information and/or the range information which are the information indicating the display content acquired by the display content acquiring unit 106 to the glasses type display terminal 2 connected via the wireless PAN (Step S3).

The determination unit 205 of the glasses type display terminal 2 sequentially determines whether or not the display area 104a of the display unit 104 of the watch type display terminal 1 exists within the display area 204a of the display unit 204 (Step S4).

More specifically, the imaging unit 203 sequentially captures images of a range almost the same as the field of vision A of the wearer S to produce a plurality of frame images. The display area detecting unit 205a of the determination unit 205 detects coordinates of a plurality of points (for example, points of four corners) of the display area 104a of the display unit 104 of the watch type display terminal 1 included within each frame image and extracts the display area 104a approximately having the shape of a frame. Then, based on the result of the detection of the display area 104a by the display area detecting unit 205a, the determination unit 205 determines whether or not the display area 104a of the display unit 104 of the watch type display terminal 1 exists within the display area 204a of the display unit 204.

The determination at Step S4 is performed sequentially at a predetermined time interval. In the case it is determined that the display area 104a of the display unit 104 of the watch type display terminal 1 does not exist within the display area 204a of the display unit 204 (Step S4; No), the determination unit 205 determines again whether or not the display area 104a of the display unit 104 of the watch type display terminal 1 exists within the display area 204a of the display unit 204 after a predetermined time elapses.

In the case it is determined at Step S4 that the display area 104a of the display unit 104 of the watch type display terminal 1 exists within the display area 204a of the display unit 204 (Step S4; Yes), the relevant information specifying unit 206a of the display control unit 206 specifies an application to be displayed by the display unit 204 based on the identification information for indicating the display content which is received by the wireless processing unit 207 (Step S5). Then, based on the range information for indicating the display content which is received by the wireless processing unit 207, the display control unit 206 specifies a display range of a display application screen to be displayed by the display unit 204, i.e. a range in the display application screen to be displayed by the display unit 204 corresponding to the display content of the watch type display terminal 1 (Step S6).

Next, the display control unit 206 positions the range of the display application screen corresponding to the display content of the watch type display terminal 1 such that it matches the application screen displayed by the display unit 104 of the watch type display terminal 1 which is being transmitted by the display area 204a and controls the display area 204a of the display unit 204 to transmit and display a part of the display application screen other than the specified range (Step S7; see FIG. 5(a)).

The display process is constantly executed and display content of the display area 204a of the display unit 204 of the glasses type display terminal 2 change according to display content of the display area 104a of the display unit 104 of the watch type display terminal 1.

For example, in the case that a map is displayed by the display unit 104 of the watch type display terminal 1 and the display unit 104 displays neighborhood of the present location of "spot A" (see FIG. 5(a)), a map of a predetermined range surrounding the "spot A" is transmitted and displayed by the display unit 204 of the glasses type display terminal 2. On the other hand, in the case the display unit 104 displays neighborhood of "Hello Work OOO" other than the present location (see FIG. 5(b)), a map of a predetermined range surrounding the "Hello Work OOO" is transmitted and displayed by the display unit 204 of the glasses type display terminal 2.

As described above, according to the display system 100 of the present embodiment, based on information indicating display content displayed by the display unit 104 of the watch type display terminal 1 sent by the watch type display terminal 1, the glasses type display terminal 2 controls the display unit 204 to display relevant information which relates to the display content of the display unit 104 of the watch type display terminal 1. Therefore, even in the case that the display area 104a of the display unit 104 of the watch type display terminal 1 does not have an area sufficient to display, for example, a map, a website, an image, or the like, it is possible to secure the display area 204a by using the display unit 204 of the glasses type display terminal 2 and display much more information efficiently.

Further, the relevant information is displayed in the display area 204a of the display unit 204 in the case that it is determined that the display area 104a of the display unit 104 of the watch type display terminal 1 exists within the display area 204a of the display unit 204 of the glasses type display terminal 2 (the display area 104a of the display unit 104 of the watch type display terminal 1 is in a location where it can be seen by the user over the display area 204a of the glasses type display terminal 2). Therefore, it is possible to change information to be displayed in the display area 204a according to whether or not the display area 104a of the display unit 104 of the watch type display terminal 1 exists within the display area 204a of the display unit 204 of the glasses type display terminal 2, i.e. whether or not the wearer S visually recognizes information displayed by the display unit 104 of the watch type display terminal 1, and this in turn improves convenience of use.

By displaying the relevant information in the display area 204a of the display unit 204 such that a part of the relevant information corresponding to the display content displayed by the display unit 104 of the watch type display terminal 1 matches the display content displayed by the display unit 104 in their positions, a sense of incompatibility does not occur to the wearer S who visually recognizes a predetermined information displayed by the display unit 104 of the watch type display terminal 1 and relevant information transmitted and displayed by the display unit 204 of the glasses type display terminal 2 even in the case the display area 104a of the display unit 104 of the watch type display terminal 1 exists within the display area 204a of the display unit 204 of the glasses type display terminal 2.

Further, the present invention is not limited to the above described embodiments and various modifications and design changes are possible without departing the scope of the invention.

The embodiment in which the glasses type display terminal 2 controls the display unit 204 to tilt and display relevant information and the watch type display terminal 1 tilts and displays content of predetermined information based on information indicating inclination of the main body of the watch type display terminal 1 is merely an example. The present invention is not limited to this embodiment and can be changed arbitrarily and properly. Although usability can be improved by changing display of the display unit 204 of the glasses type display terminal 2 or the display unit 104 of the watch type display terminal 1 in accordance with the inclination of the main body of the watch type display terminal 1, the watch type display terminal 1 does not necessarily include the inclination detecting unit 103.

Further, the embodiment in which the determination unit 205 determines whether or not the display area 104a of the display unit 104 of the watch type display terminal 1 exists within the display area 204a of the display unit 204 based on the result of the detection of the display area 104a of the display unit 104 of the watch type display terminal 1 by the display area detecting unit 205a is merely an example. The present invention is not limited to this embodiment and can be changed arbitrarily and properly. For example, it is possible to detect whether or not the wearer S visually recognizes the display area 104a of the display unit 104 of the watch type display terminal 1 and determine whether or not the display area 104a of the display unit 104 of the watch type display terminal 1 exists within the display area 204a of the display unit 204 which transmits light of an outside image based on the detection result.

Further, although the embodiment described above uses a wireless communication line as a communication line, a wired communication line which connects the glasses type display terminal 2 and the watch type display terminal 1 by a wired cable can also be used.

In addition, the configuration of the display system 100, or the configuration of the watch type display terminal 1 or the glasses type display terminal 2 included in the display system 100 illustrated in the embodiments described above is merely an example and the present invention is not limited to these embodiments.

For example, a smart phone, a mobile phone, a PHS (Personal Handy-phone System), or a PDA (Personal Data Assistants) can be adopted instead of the watch type display terminal 1.

Furthermore, according to the embodiment, functions as a receipt control means and a display control means are realized by driving the wireless processing unit 207 and the display control unit 206 under control of the central control unit 201 of the glasses type display terminal 2, but the present invention is not limited to this embodiment. The functions may be realized by executing a predetermined program by the central control unit 201.

More specifically, a program memory (not shown in the drawing) stores a program including a receipt control process routine and a display control process routine. The receipt control process routine may control the CPU of the central control unit 201 to function as a means for receiving information indicating display content displayed by a different display terminal which is sent by the different display terminal. Further, the display control process routine may control the CPU of the central control unit 201 to function as a means for displaying relevant information which is related to the display content of the different display terminal based on the received information indicating the display content.

Similarly, a determination means may be realized by executing a predetermined program by the CPU of the central control unit 201 of the glasses type display terminal 2.

Further, a computer readable medium in which a program for executing each of the above described processes is stored may include a non-volatile memory such as a flash memory and a portable recording medium such as a CD-ROM as well as a ROM and a hard disk. In addition, a carrier wave can be adopted as a medium for providing program data via a predetermined communication line.

Although some embodiments of the present invention have been described above, the embodiments are for illustrative purposes only and not intended to limit the technical scope of the present invention. It will be evident that there are many other possible embodiments of the present invention and various modifications such as omission or substitution may be made without departing from the spirit of the invention. These embodiments and modifications fall within the scope and the spirit of the invention described in this specification and within the scope of the invention as defined in the appended claims and equivalents thereof.

What is claimed is:

1. A display system comprising: a first display terminal; and a second display terminal, wherein the first display terminal comprises: a first display unit configured to display first information; an acquiring unit including an electronic storage device configured to acquire information indicating display content which are being displayed by the first display unit; and a sending unit including a wireless processing unit configured to send the information indicating the display content acquired by the acquiring unit to the second display terminal which is communicably connected to the first display terminal, and the second display terminal comprises: a second display unit; a receiving unit including a wireless processing unit configured to receive the information indicating the display content which is sent from the first display terminal; a control unit including a processor configured to control the second display unit to display relevant information which is related to the display content of the first display unit, based on the information indicating the display content received by the receiving unit; and wherein the control unit controls the second display unit to display the relevant information based on a position of the first display terminal within the relevant information displayed on the second display unit; and the second display terminal further comprises a determining unit having a display area detecting unit and being configured to determine whether or not a display area of the first display unit exists in a location where a user can see the first display unit display area through a display area of the second display terminal, and the control unit controls the second display unit to display the relevant information in the display area of the second display unit in the case that the determining unit determines that the display area of the first display unit exists in the location; and wherein the display area detecting unit is operable to detect a plurality of points of the first display unit display area in the display area of the second display terminal.

2. The display system of claim 1, wherein the information indicating the display content includes range information indicating a range which is being displayed by the first display unit.

3. The display system of claim 2, wherein the relevant information includes information corresponding to the display content which are being displayed by the first display unit as its part, and
 the control unit further controls the second display unit to display the relevant information in the display area of the second display unit such that a position of the information corresponding to the display content which is included in the relevant information matches that of the display content which are being displayed by the first display unit in the case that the determining unit determines that the display area of the first display unit exists in the location.

4. The display system of claim 2, wherein the relevant information is information other than the display content which are being displayed by the first display unit, and
 the control unit further controls the second display unit to display the relevant information in the display area such that a position of information corresponding to the display content which is included in the relevant information matches that of the display content which are being displayed by the first display unit in the case that the determining unit determines that the display area of the first display unit exists in the location.

5. The display system of claim 1, wherein the second display unit displays the relevant information in the display area such that light of the relevant information is superimposed onto light of an outside image and transmitted by the display area.

6. The display system of claim 1, wherein the first display terminal further comprises a detecting unit configured to detect an inclination of the terminal's main body,
 the sending unit sends information indicating the inclination of the terminal's main body detected by the detecting unit to the second display terminal, and the control unit of the second display terminal tilts the relevant information based on the information indicating the inclination of the main body of the first display terminal received by the receiving unit and controls the second display unit to display it.

7. The display system of claim 6, wherein the first display unit of the first display terminal tilts the display content based on the information indicating the inclination of the terminal's main body detected by the detecting unit and displays the display content.

8. The display system of claim 1, wherein the first display terminal is a watch type display terminal worn on a wrist and the second display terminal is a glasses type display terminal worn on a head.

9. A display terminal comprising: a receiving unit including a wireless processing unit configured to receive information indicating display content which are being displayed by a different display terminal communicably connected to the display terminal, the information being sent from the different display terminal; and a control unit including a processor configured to start the application and control a display unit to display relevant information which is related to the display content of the different display terminal based on the information indicating the display content received by the receiving unit, wherein the control unit controls the display unit to display the relevant information based on a position of the different display terminal within the relevant information displayed on the display unit, the position of the different display terminal being detected by a detecting unit of the display terminal; and wherein the detecting unit is operable to detect a plurality of points of the different display terminal in a display area of the display unit.

10. A display method comprising: acquiring, by a first display terminal of a plurality of display terminals communicably connected to each other, information indicating display content which are being displayed by a first display unit; sending, by the first display terminal, the acquired information indicating the display content to a second display terminal of the plurality of display terminals; receiving, by the second display terminal, the information indicating the display content sent from the first display terminal; and controlling, by the second display terminal, a second display unit to display relevant information which is related to the display content of the first display unit, and further controlling the second display unit to display the relevant information based on a position of the first display terminal within the relevant information displayed on the second display unit, the position of the first display terminal being detected by a detecting unit of the second display terminal; and wherein the detecting unit is operable to detect a plurality of points of the first display unit in a display area of the second display unit.

11. A computer-readable non-transitory recording medium for recording a program readable by a computer of a display terminal communicably connected to a different display terminal, the program controlling the computer to function as: a receipt control unit including a wireless processing unit configured to receive information indicating display content which are being displayed by the different display terminal, the information being sent from the different display terminal; and a display control unit including a processor configured to control a display unit to display relevant information which is related to the display content of the different display terminal based on the received information indicating the display content wherein the display control unit controls the display unit to display the relevant information based on a position of the different display terminal within the relevant information displayed on the display unit, the position of the different display terminal being detected by a display detecting unit of the display terminal; and wherein the display detecting unit is operable to detect a plurality of points of the different display terminal in a display area of the display unit.

12. The display system according to claim 1 wherein the control unit controls the second display unit to display the relevant information such that the first information displayed on the first display superposed the relevant information displayed on the second display.

13. The display system according to claim 1 wherein the control unit controls the second display unit to display the relevant information such that a region of the relevant information corresponding to the first information coincides displayed the first information by the first display unit, and wherein the control unit controls the second display unit to display the relevant information which includes the other than the first information.

14. The display system according to claim 1 wherein the control unit controls the second display unit to display the relevant information such that a content of the relevant information transitions with the position of the first display terminal.

15. The display system according to claim 1 wherein the control unit controls the second display unit to display the relevant information so the relevant information changes to correspond to changes in the position of the first display terminal.

* * * * *